(12) United States Patent
Barak

(10) Patent No.: US 11,027,975 B2
(45) Date of Patent: Jun. 8, 2021

(54) METHOD TO MAKE PHOSPHORIC ACID AND AMMONIUM PHOSPHATES FROM PHOSPHATE MINERALS

(71) Applicant: Wisconsin Alumni Research Foundation, Madison, WI (US)

(72) Inventor: Phillip Warren Barak, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 16/778,474

(22) Filed: Jan. 31, 2020

(65) Prior Publication Data

US 2020/0247674 A1 Aug. 6, 2020

Related U.S. Application Data

(60) Provisional application No. 62/799,372, filed on Jan. 31, 2019.

(51) Int. Cl.
| | | |
|---|---|---|
| *C01B 25/18* | (2006.01) | |
| *B01J 39/02* | (2006.01) | |
| *B01J 39/12* | (2006.01) | |
| *C05B 11/00* | (2006.01) | |

(52) U.S. Cl.
CPC ............ *C01B 25/185* (2013.01); *B01J 39/02* (2013.01); *B01J 39/12* (2013.01); *C05B 11/00* (2013.01)

(58) Field of Classification Search
CPC ......... C01B 25/185; B01J 39/12; B01J 39/02; C05B 11/00
See application file for complete search history.

(56) References Cited

U.S. PATENT DOCUMENTS

| | | | |
|---|---|---|---|
| 3,494,735 A | 2/1970 | Cochran | |
| 3,645,682 A | 2/1972 | Cochran | |
| 5,993,503 A * | 11/1999 | Kruidhof | .................. C05F 3/00 71/21 |
| 6,180,016 B1 * | 1/2001 | Johnston | ................ C02F 1/288 210/767 |
| 7,182,872 B2 | 2/2007 | Barak et al. | |
| 7,674,379 B2 | 3/2010 | Vanotti et al. | |
| 8,158,089 B2 | 4/2012 | Zhang et al. | |
| 8,568,590 B2 | 10/2013 | Barak | |
| 8,747,672 B2 | 6/2014 | Bowers | |
| 8,864,992 B2 | 10/2014 | Barak | |
| 9,334,166 B2 | 5/2016 | Bowers | |
| 9,561,973 B2 | 2/2017 | Barak | |
| 9,878,960 B2 | 1/2018 | Clark et al. | |
| 10,099,926 B2 | 10/2018 | Bowers | |
| 10,189,711 B2 | 1/2019 | Bowers | |
| 2017/0129819 A1 * | 5/2017 | Voogt | ...................... C05B 17/00 |

FOREIGN PATENT DOCUMENTS

| | | |
|---|---|---|
| EP | 3266742 A1 | 1/2018 |
| GB | 1172293 A | 11/1969 |

OTHER PUBLICATIONS

D.E.C Cobridge, Phosphorus: Chemistry, Biochemistry, and Technology, 6$^{th}$ ed. CRC Press, Boca Raton, FL, 2010 (Book—Copy Not Provided).
Elgafi, M.I. © 2017. Phosphoric Acid and Phosphate Fertilizers—vol. I: State of the Art and Future Trends, Pacific Academic Press (Forest Grove, Oregon, USA), ISBN 978-0692926062.) (Book—Copy Not Provided).
IUPAC. Compendium of Chemical Terminology, 2nd ed. (the "Gold Book"). Compiled by A. D. McNaught and A. Wilkinson. Blackwell Scientific Publications, Oxford ( © 1997). Online version (2019-) created by S. J. Chalk. ISBN 0-9678550-9-8.) (Book—Copy Not Provided).
Jaffer et al., 2002. Potential phosphorus recovery by struvite formation. *Water Research* 36:1834-1842.
Kataki et al., 2016. Phosphorus recovery as struvite: Recent concerns for use of seed, alternative Mg source, nitrogen conservation and fertilizer potential. *Resources, Conservation and Recycling* 107:142-156.
Matula, J. 2011. Relationship between phosphorus concentration in soil solution and phosphorus in shoots of barley. *Plant Soil and Environment* 57:307-314.
Morse et al., Mar. 5, 1998. Review: Phosphorus removal and recovery technologies. *Science of the Total Environment* 212(1):69-81.
Pierzynski, G. M., J. T. Sims, and G. F. Vance. 2000. Soils and Environmental Quality. 2nd ed. CRC Press, Boca Raton, Florida, USA (Book—Copy Not Provided).
Rawn et al., 1939. Multiple stage sewage digestion. *Trans. Am. Soc. Civil Eng.* 105:93-132.
Zagorodni, A.A. © 2007. Ion Exchange Materials: Properties and Applications. Elsevier, Amsterdam, ISBN: 978-0080445526.
U.S. Pharmacopoeia (see usp.org and "Pharmacopeia of the United States of America, 32nd revision and the National Formulary, 27th edition," 2009, p. 1-12.) (Book—Copy Not Provided).
International Search Report and Written Opinion, PCT/US2020/016139, dated May 11, 2020.

* cited by examiner

*Primary Examiner* — Anthony J Zimmer
(74) *Attorney, Agent, or Firm* — Joseph T. Leone, Esq.; DeWitt LLP

(57) ABSTRACT

A method of producing phosphoric acid from at least one mineral containing phosphate and an element which is calcium, magnesium, iron, or aluminum. The method includes contacting the at least one mineral (or a combination of them) with a cation exchanger for a time and at a temperature sufficient to yield phosphoric acid from the mineral.

20 Claims, 3 Drawing Sheets

METHOD TO MAKE PHOSPHORIC ACID AND AMMONIUM PHOSPHATES FROM PHOSPHATE MINERALS

CROSS-REFERENCE TO RELATED APPLICATIONS

Priority is hereby claimed to provisional application Ser. No. 62/799,372, filed Jan. 31, 2019, which is incorporated herein.

FEDERAL FUNDING STATEMENT

This invention was made with government support under 2016-33610-25444 awarded by the USDA/NIFA. The government has certain rights in the invention.

BACKGROUND

Phosphate in water has been a growing environmental problem as a result of the increased amount of phosphate entering bodies of water from point and nonpoint sources. One specific problem related to waste phosphorus is eutrophication of water, i.e., "the enhancement of phytoplankton growth because of nutrient enrichment" (See, for example, Pierzynski, G. M., J. T. Sims., and G. F. Vance. 2000. Soils and Environmental Quality. 2nd ed. CRC Press, Boca Raton, Fla., USA.) The eutrophication of bodies of water has many negative effects on the aquatic biome and can eventually lead to severe economic, environmental, and human health problems. An increase in the amount of phosphates in a body of water leads to the growth of aquatic weeds and algae (algae bloom). An algae bloom decreases the amount of oxygen in the water and decreases sunlight penetration into the water because of increased surface plant growth. These effects contribute to the elimination of bottom-dwelling plants and organisms and can lead to large-scale events, such as fish kills. The decreased amount of dissolved oxygen in water is a result of increased amount of microbial growth that feeds off of plant residues. Algae blooms and fish kills then cause odors and insect problems.

In some situations, algae blooms can result in human health hazards. Blue-green algae (cyanobacteria) naturally release toxins which in great amounts kill livestock and create a human health hazard. Pfiesteriapiscicida is a dinoflaggellate that releases toxins that kills fish and causes lesions. Exposure to Pfiesteria causes symptoms of "headache, blurred vision, sores, reddening of the eyes, memory loss, and cognitive impairment" (Pierzynski et al., 2000, supra).

Struvite ($NH_4MgPO_4.6H_2O$) and brushite ($CaHPO_4.2H_2O$) are naturally occurring, phosphate-containing minerals found in manure and guano. Notably, struvite formation can be a problem in wastewater treatment plants because of nucleation in unplanned locations. This results in crystal accumulation in pipes, which causes flow reductions. (Rawn, A. M., Banta, A. P., Pomeroy, R. 1939. Multiple stage sewage digestion. $Trans. Am. Soc. Civil Eng.$ 105:93-132.). Once formed, removing struvite crystals from pipes is difficult and expensive. Conventionally, iron and aluminum salts are added to waste-water streams to precipitate the phosphate, which also has the added benefit of inhibiting the formation of struvite crystals.

There exists considerable interest in recycling phosphorus from waste-water streams in the form of struvite, for both environmental and commercial reasons. The European Union goal is to recover and recycle at least 25% of waste phosphorus. Because waste-water streams must be purified in any event (by law in industrialized countries), it is commercially attractive to use the existing waste-water treatment infrastructure as a means to recover phosphorus-containing compounds for resale.

The earliest commercial struvite recovery operation appears to be that of Unitika Ltd. (Tokyo, Japan). Unitka has branded its process as the "Phosnix" process. In the Phosnix process, magnesium chloride and alkali are mixed with wastewater to promote nucleation and growth of struvite crystals. See G. K. Morse, S. W. Brett, J. A. Guy J. N. Lester. 5 Mar. 1998. Review: Phosphorus removal and recovery technologies. $Science of The Total Environment$ 212(1):69-81.

One of the better, if now slightly aged, economic analyses regarding phosphorus removal and recovery via struvite formation is that of a pilot plant designed for the Slough (UK) Sewage Treatment Works. See Jaffer, Y., T. A. Clark, P. Pearce, and S. A. Parsons. 2002. Potential phosphorus recovery by struvite formation. $Water Research$ 36:1834-1842. This water treatment plant isolates approximately 520 kg of struvite from 64,000 $m^3$ sewage per day.

In the patent literature, U.S. Pat. No. 8,568,590, issued Oct. 29, 2013, describes a method for recovering phosphate from sewage treatment plants using multi-stage anaerobic digestion. The method includes treating an organic acid digest with calcium hydroxide and/or calcium oxide in sufficient amounts to raise the pH of the digest to near neutral values and then precipitating calcium phosphate compounds (such as brushite) from the digest. See also related U.S. Pat. No. 8,864,992 (issued Oct. 21, 2014) and U.S. Pat. No. 9,561,973 (issued Feb. 7, 2017).

U.S. Pat. No. 7,182,872, issued Feb. 27, 2007, describes a method and apparatus for removing phosphorus from phosphorus-containing waste. The method includes contacting the phosphorus-containing waste with a non-cellular membrane and precipitating phosphorus from the waste as struvite. In the first step, sewage from a dewatering unit is contacted with a first polymeric membrane reactor and the phosphorus is removed as primary struvite. Subsequently, magnesium is added to the permeate/filtrate so as promote struvite formation. The permeate/filtrate is then passed through a second, monomolecular membrane and the phosphorus is removed as secondary struvite.

U.S. Pat. No. 9,878,960, issued Jan. 30, 2018, describes a homogeneous fertilizer granule containing a slow-release phosphorus source, which can be struvite, and a fast-release phosphorus source. The homogeneous fertilizer granule may further contain other essential nutrients and micronutrients required by plants.

Multiform Harvest Inc., of Seattle, Wash., owns several patents for isolating phosphorus from waste-water streams, as well as methods for producing struvite. See U.S. Pat. No. 8,158,089, issued Apr. 17, 2012; U.S. Pat. No. 8,747,672, issued Jun. 10, 2014; U.S. Pat. No. 9,334,166, issued May 10, 2016; U.S. Pat. No. 10,099,926, issued Oct. 16, 2018; and U.S. Pat. No. 10,189,711, issued Jan. 29, 2019.

See also U.S. Pat. No. 7,674,379, issued Mar. 9, 2010, to Vanotti et al. This patent describes a process for removing solids, pathogens, nitrogen, and phosphorus from municipal and agricultural wastewater. The process results in the simultaneous separation of solids and phosphorus from wastewater stream.

SUMMARY

Although known for over 150 years, neither brushite nor struvite have been significant ores for the phosphate market because of their rarity in nature. As discussed in the background section, modern wastewater treatment methods are increasingly turning to recovering phosphate from wastewater as either brushite or struvite.

Both brushite and struvite are likely usable "as-is" as a phosphorus source in fertilizers. However, neither mineral has any market recognition. Thus, it is likely more economically feasible to convert brushite and struvite into known and well accepted phosphorus sources for fertilizers and fertilizer precursors. To that end, disclosed herein is a cost-effective method for converting brushite and struvite into ammonium phosphates or phosphoric acid or combinations thereof. Thus, the present method provides commercial market re-entry for phosphorus that has been isolated in the form of brushite and/or struvite from waste-water streams in municipal waste-water treatment plants. The resulting income can be used to offset the cost of operating the treatment plant.

More specifically, the present method exploits the sparingly soluble nature of brushite, struvite, and related minerals in neutral aqueous solutions. These minerals include (by way of example and not limitation) brushite ($CaHPO_4.2H_2O$), struvite ($NH_4MgPO_4.6H_2O$), monetite ($CaHPO_4$), octacalcium phosphate ($Ca_4H(PO_4)_3.2\frac{1}{2}H_2O$), newberryite ($MgHPO_4.3H_2O$), bobierrite ($Mg_3(PO_4)_2.8H_2O$), strengite ($FePO_4.2H_2O$), vivianite ($Fe_3(PO_4)_2.8H_2O$), variscite ($AlPO_4.2H_2O$), berlinite ($AlPO_4$), and amorphous, noncrystalline phosphate residuals recovered from wastewater treatment. These minerals also have increased solubility in acidic aqueous solutions. The conventional approach to making phosphoric acid from insoluble, phosphate-containing rock is to treat the rock with a strong aqueous solution of sulfuric acid. The same approach can be used with brushite. In both instances, though, the resulting acidic solution contains the desired phosphoric acid, but contaminated with calcium sulfate (i.e., gypsum). Likewise, when that approach is used with struvite, the resulting acidic solution contains the desired phosphoric acid, but contaminated with magnesium sulfate. Separating the desired phosphoric acid product from the $Ca^{2+}$, $Mg^{2+}$ and $SO_4^{2-}$ contaminants (and/or the precipitated gypsum contaminant) diminishes or eliminates the economic viability of recovering the phosphoric acid.

Rather than dissolve the brushite or struvite in a strong acid solution, in the present method, brushite and/or struvite may be contacted with a solid, acid-charged cation exchanger. This yields a liquid product comprised of phosphoric acid without any solid contaminants. The cations ($Ca^{2+}$ in the case of brushite and $Mg^{2+}$ in the case of struvite) are adsorbed to the cation exchange resin. It is then a simple matter to separate the relatively large cation exchanger particles from the phosphoric acid solution by simple filtration. The cation exchanger is then recharged by treating it with a strong acid, which may be concentrated or not.

The method exploits the sparingly soluble nature of brushite and struvite minerals to dissolve them with a solid, acid-charged cation exchanger to produce a liquid, phosphoric acid product that is easily separated from the solid by-products (i.e., the ion exchanger), obviating the need for more complex separation steps to attain the desired product.

The method yields non-contaminated and non-radioactive phosphate solutions and by-products (e.g., gypsum) that can be readily used, processed, or landfilled. In contrast, conventional acidulation of rock phosphate produces phosphoric acid and gypsum products that are slightly radioactive and include problematic contaminants (e.g., naturally occurring mercury, fluorine, and uranium) that complicate using and disposing of the products.

The method is easily implemented in municipal and/or commercial/industrial wastewater treatment plants to remove phosphorus and thereby save significant maintenance complications associated with the unwanted build-up of struvite in pipes.

Thus, disclosed and claimed herein are the following:

1. A method of producing phosphoric acid comprising:
contacting at least one mineral with a cation exchanger for a time and at a temperature sufficient to yield phosphoric acid from the mineral, wherein the mineral comprises phosphate and at least one element selected from the group consisting of calcium, magnesium, iron, and aluminum, and wherein the mineral is slightly soluble or sparing soluble in water of pH 7.0 and has increased solubility in acidic water having a pH range from about 2.0 to less than 7.0.

2. The method of claim 1, wherein the cation exchanger comprises a solid substrate functionalized with a cation exchange moiety selected from the group consisting of carboxylic acid, sulfonic acid, phosphonic acid, carboxyalkyl, sulfoalkyl, phosphoalkyl, sulfoxyalkyl, and orthophosphate.

3. The method of Claim 1, comprising contacting with the cation exchanger at least one mineral selected from the group consisting of brushite ($CaHPO_4.2H_2O$), struvite ($NH_4MgPO_4.6H_2O$), monetite ($CaHPO_4$), octacalcium phosphate ($Ca_4H(PO_4)_3.2\frac{1}{2}H_2O$), newberryite ($MgHPO_4.3H_2O$), bobierrite ($Mg_3(PO_4)_2. H_2O$), strengite ($FePO_4.2H_2O$), vivianite ($Fe_3(PO_4)_2.8H_2O$), variscite ($AlPO_4.2H_2O$), berlinite ($AlPO_4$), and amorphous, noncrystalline phosphate residuals recovered from wastewater treatment.

4. The method of claim 3, wherein the cation exchanger comprises a solid substrate functionalized with a cation exchange moiety selected from the group consisting of carboxylic acid, sulfonic acid, phosphonic acid, carboxyalkyl, sulfoalkyl, phosphoalkyl, sulfoxyalkyl, and orthophosphate.

5. The method of claim 1, comprising contacting brushite with the cation exchanger.

6. The method of claim 5, wherein the cation exchanger comprises a solid substrate functionalized with a cation exchange moiety selected from the group consisting of carboxylic acid, sulfonic acid, phosphonic acid, carboxyalkyl, sulfoalkyl, phosphoalkyl, sulfoxyalkyl, and orthophosphate.

7. The method of claim 1, comprising contacting struvite with the cation exchanger.

8. The method of claim 7, wherein the cation exchanger comprises a solid substrate functionalized with a cation exchange moiety selected from the group consisting of carboxylic acid, sulfonic acid, phosphonic acid, carboxyalkyl, sulfoalkyl, phosphoalkyl, sulfoxyalkyl, and orthophosphate.

9. The method of claim 1, wherein the at least one mineral is isolated from a water stream.

10. The method of claim 1, wherein the cation exchanger is acid-charged.

11. A method of producing phosphoric acid comprising:
(a) isolating from a water stream at least one mineral, wherein the mineral comprises phosphate and at least one element selected from the group consisting of calcium, magnesium, iron, and aluminum, and wherein the mineral is slightly soluble or sparing soluble in water of pH 7.0 and has increased solubility in acidic water having a pH range from about 2.0 to less than 7.0; and (b) contacting the at least one mineral with a cation exchanger for a time and at a temperature sufficient to yield phosphoric acid from the mineral.

12. The method of claim 11, wherein the cation exchanger of step (b) comprises a solid substrate functionalized with a cation exchange moiety selected from the group consisting of carboxylic acid, sulfonic acid, phosphonic acid, carboxyalkyl, sulfoalkyl, phosphoalkyl, sulfoxyalkyl, and orthophosphate.

13. The method of Claim 11, wherein step (b) comprises contacting with the cation exchanger at least one mineral selected from the group consisting of brushite ($CaHPO_4.2H_2O$), struvite ($NH_4MgPO_4.6H_2O$), monetite ($CaHPO_4$), octacalcium phosphate ($Ca_4H(PO_4)_3.2½H_2O$), newberryite ($MgHPO_4.3H_2O$), bobierrite ($Mg_3(PO_4)_2.8H_2O$), strengite ($FePO_4.2H_2O$), vivianite ($Fe_3(PO_4)_2.8H_2O$), variscite ($AlPO_4.2H_2O$), berlinite ($AlPO_4$), and amorphous, noncrystalline phosphate residuals recovered from wastewater treatment.

14. The method of claim 13, wherein the cation exchanger of step (b) comprises a solid substrate functionalized with a cation exchange moiety selected from the group consisting of carboxylic acid, sulfonic acid, phosphonic acid, carboxyalkyl, sulfoalkyl, phosphoalkyl, sulfoxyalkyl, and orthophosphate.

15. The method of claim 11, wherein step (b) comprises contacting brushite with the cation exchanger.

16. The method of claim 15, wherein the cation exchanger of step (b) comprises a solid substrate functionalized with a cation exchange moiety selected from the group consisting of carboxylic acid, sulfonic acid, phosphonic acid, carboxyalkyl, sulfoalkyl, phosphoalkyl, sulfoxyalkyl, and orthophosphate.

17. The method of claim 11, wherein step (b) comprises contacting struvite with the cation exchanger.

18. The method of claim 17, wherein the cation exchanger of step (b) comprises a solid substrate functionalized with a cation exchange moiety selected from the group consisting of carboxylic acid, sulfonic acid, phosphonic acid, carboxyalkyl, sulfoalkyl, phosphoalkyl, sulfoxyalkyl, and orthophosphate.

19. The method of claim 11, wherein step (a) comprises isolating the at least one mineral from a waste-water stream.

20. The method of claim 11, wherein the cation exchanger is acid-charged.

DETAILED DESCRIPTION

Abbreviations and Definitions

Figure 1:
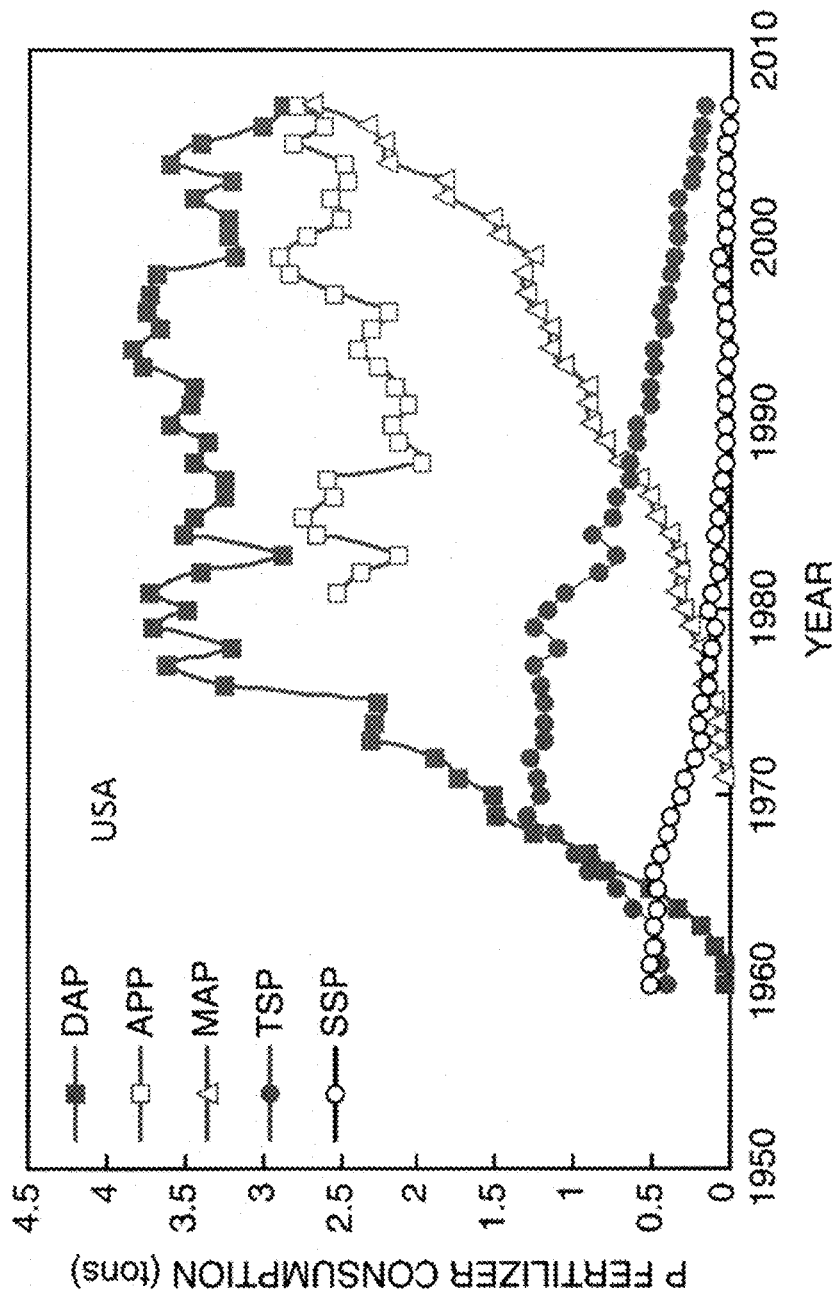
FIG. 1. United States phosphorus fertilizer use: di-ammonium phosphate (DAP), ammonium poly phosphate (APP), mono-ammonium phosphate (MAP), triple super phosphate (TSP), single super phosphate (SSP). (From Havlin et al., 2014. Soil Fertility and Fertilizers: an introduction to nutrient management, 8th Ed. Pearson Inc., New Jersey.)

APP=ammonium polyphosphate. DAP=diammonium phosphate. MAP=monoammonium phosphate. Other N—P=other phosphorus and nitrogen fertilizer. Other P=other phosphate fertilizer. RP=rock phosphate. SSP=single superphosphate. TSP=triple superphosphate.

"Ion exchanger" is broadly defined herein to refer to any inert resin, support, or substrate that is dimensioned, configured, and capable of acting as a medium for ion exchange, without limitation. Anionic exchangers exchange one type of anion for another (i.e., exchange a first negatively charged ion for a second negatively charged ion). Cation exchangers exchange one type of cation for another (i.e., exchange a first positively charged ion for a second positively charged ion). An ion exchanger comprises an insoluble inert matrix (or support) of any shape or size (but preferably in the form of small beads ranging from roughly 0.1 mm to 1 mm), fabricated from any suitable inert material (typically an organic polymer). As used herein, the term "resin" is used synonymously with "matrix" and "support" and includes both organic, polymeric supports and inorganic supports. The matrix is preferably porous, thus providing a large surface area for ion exchange to take place. Most commercial ion exchangers use a substrate comprising a cross-linked polystyrene matrix that has been functionalized to includes an ion exchange moiety. The substrate can be further functionalized to provide improved or specific ion exchange functionality. A very large number of ion exchangers, both anionic and cationic, are available commercially from global suppliers. Typical cation exchangers are functionalized to contain an acidic moiety that will exchange hydrogen cations, $H^+$ or $H_3O^+$, for cations present in an aqueous solution. The acidic moiety may be, for example (and not by way of limitation), carboxylic acid/carboxylate ($COO^-$), sulfonic acid/sulfonate ($SO_3^-$), or phosphonic acid/phosphonate ($H_2PO_3^-$ [$pK_a$ 1.3], $HPO_3^{2-}$ [$pK_a$ 6.7]). A non-exclusive list of commercially available cationic ion exchangers that can be used in the present method include those having a sulfonate-based ion exchange group, such as MonoS, MiniS, Source 15S and 30S, SP "SEPHAROSE"® FAST FLOW, and SP "SEPHAROSE"® High Performance, all from GE Healthcare Bioprocess R&D AB (Uppsala, Sweden), "TOYOPEARL"® SP-650S and SP-650M from Tosoh Corporation (Yamaguchi, Japan), Macro-Prep High S from BioRad Laboratories, Inc. (Hercules, Calif., USA), Ceramic "HYPERD"® S, "TRISACRYL"® M and LS SP and Spherodex LS SP from Pall Corporation (Port Washington, N.Y., USA); a sulfoethyl-based ion exchange group, such as "FRACTOGEL"® SE from Merck KGAA (Darmstadt, Germany) and "POROS"® S-10 and S-20 from Applied Biosystems, LLC (Foster City, Calif., USA); a sulfopropyl-based exchange group, such as TSK Gel SP 5PW and SP-5PW-HR from Tosoh Corporation, "POROS"® HS-20 and HS 50 from Applied Biosystems; a sulfo-isobutyl-based group, such as "FRACTOGEL" EMD $SO_3$ from Merck KGAA; a sulfoxyethyl-based group, for example SE52, SE53 and Express-Ion S from Whatman plc (a wholly owned subsidiary of GE Healthcare, Little Chalfont, Buckinghamshire, England), a carboxymethyl-based ion exchange group, such as CM "SEPHAROSE"® Fast Flow from GE Healthcare, Hydrocell CM from BioChrom Labs Inc. (Foster City, Calif., USA), Macro-Prep CM from Bio-Rad, Ceramic "HYPERD"® CM, "TRISACRYL"® M CM, "TRISACRYL"® LS CM, from Pall Corporation, Matrex "CELLUFINE"® C500 and C200 from JNC Corporation (Tokyo, Japan), CM52, CM32, CM23 and Express-Ion C from Whatman, "TOYOPEARL"® CM-650S, CM-650M and CM-650C from Tosoh Corporation; sulfonic- and carboxylic acid-based groups, such as "BAKERBOND"® Carboxy-Sulfon from Avantor Performance Materials, LLC (Center Valley, Pa., USA); a carboxylic acid-based group, for example WP CBX from Avantor, "DOWEX"® MAC-3 from Dow Chemical Company (Midland, Mich., USA), "AMBERLITE"®-brand weak cation exchange resins (Rohm and Hass Company, Philadelphia, Pa., USA), "DOWEX"® weak cation exchangers (Dow Chemical), "DIAION"®-brand cation exchangers from Mitsubishi Chemical Corporation, and "FRACTOGEL"® COO from Merck KGAA; a sulfonic acid-based ion exchange group, such as Hydrocell SP from BioChrom Labs, "DOWEX"® Fine Mesh Strong Acid Cation Resin from Dow Chemicals, UNOsphere S and WP Sulfonic from Avantor, "SARTO-BIND"® S-brand membrane from Sartorius Stedim Biotech GmbH (Goettingen, Germany), "AMBERLITE"®-brand strong cation exchangers (Rohm and Hass), "DOWEX"® strong cation exchangers (Dow Chemical) and "DIAION"®-brand cation exchangers from Mitsubishi Chemical; and an orthophosphate-based group, such as pI 1-brand resins from Whatman. A cation exchange membrane may be used (instead of a beads or other discrete particles), for example "SARTOBIND"® S-brand membranes from Sartorius.

"Solubility" is defined by the International Union of Pure and Applied Chemistry as follows: "The analytical composition of a saturated solution, expressed in terms of the proportion of a designated solute in a designated solvent, is the solubility of that solute. The solubility may be expressed as a concentration, molality, mole fraction, mole ratio, etc." (See *IUPAC. Compendium of Chemical Terminology*, 2nd ed. (the "Gold Book"). Compiled by A. D. McNaught and A. Wilkinson. Blackwell Scientific Publications, Oxford (©1997). Online version (2019-) created by S. J. Chalk. ISBN 0-9678550-9-8.) Solubility is described herein using the long-established set of descriptive terms set forth in the U.S. Pharmacopoeia (see usp.org and "Pharmacopeia of the United States of America, 32nd revision and the National Formulary, 27th edition," 2009, p. 1-12.)

| Term | Mass parts of solvent required to dissolve 1 mass part of solute |
|---|---|
| Very soluble | <1 |
| Freely soluble | 1 to 10 |
| Soluble | 10 to 30 |
| Sparingly soluble | 30 to 100 |
| Slightly soluble | 100 to 1,000 |
| Very slightly soluble | 1,000 to 10,000 |
| Practically insoluble or insoluble | >10,000 |

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations of the present method shall include the corresponding plural characteristic or limitation, and vice-versa, unless otherwise specified or clearly implied to the contrary by the context in which the reference is made. The indefinite articles "a" and "an" mean "one or more."

All combinations of method or process steps as used herein can be performed in any order, unless otherwise specified or clearly implied to the contrary by the context in which the referenced combination is made.

The method disclosed herein can comprise, consist of, or consist essentially of the essential steps and/or limitations of the method as described, as well as any additional or optional steps or limitations described herein or otherwise useful in isolating phosphorus-containing solutions.

The Method:

As noted above, a growing interest in removing phosphorus from wastewater for water quality improvement and nutrient recycling has led to two major processes to recover phosphorus using crystallization reactions: the struvite (magnesium ammonium phosphate hexahydrate) process and the brushite (dicalcium phosphate dihydrate) process. In the struvite process, magnesium is added to an anaerobic digest, usually as its chloride salt but sometimes as a base (magnesium oxide/hydroxide) to raise the pH of the digest. Phosphorus is then recovered in the form of struvite, which precipitates from the reaction mixture. In the brushite process, the effluent from an organic acid digester is reacted with calcium hydroxide to raise the pH of the effluent and to supply an excess concentration of calcium for complete brushite formation (which precipitates from the reaction).

Use of Brushite and Struvite as a Slow-Release High-Grade Phosphorus Fertilizer:

Since the 1970's, the consumption of phosphorus fertilizers in the U.S. has approximately doubled. See FIG. 1. Over the same time period, global consumption has increased approximately six times. See FIG. 2. Regarding the sharp increase in global fertilizer use, this is due to increased global distribution of fertilizers, coupled with the conversion of large areas of land in tropical zones to agricultural use. Phosphorus needs in tropical climates are higher than in temperate regions, and made higher still when agricultural land is managed more intensively to raise productivity.

Figure 2:
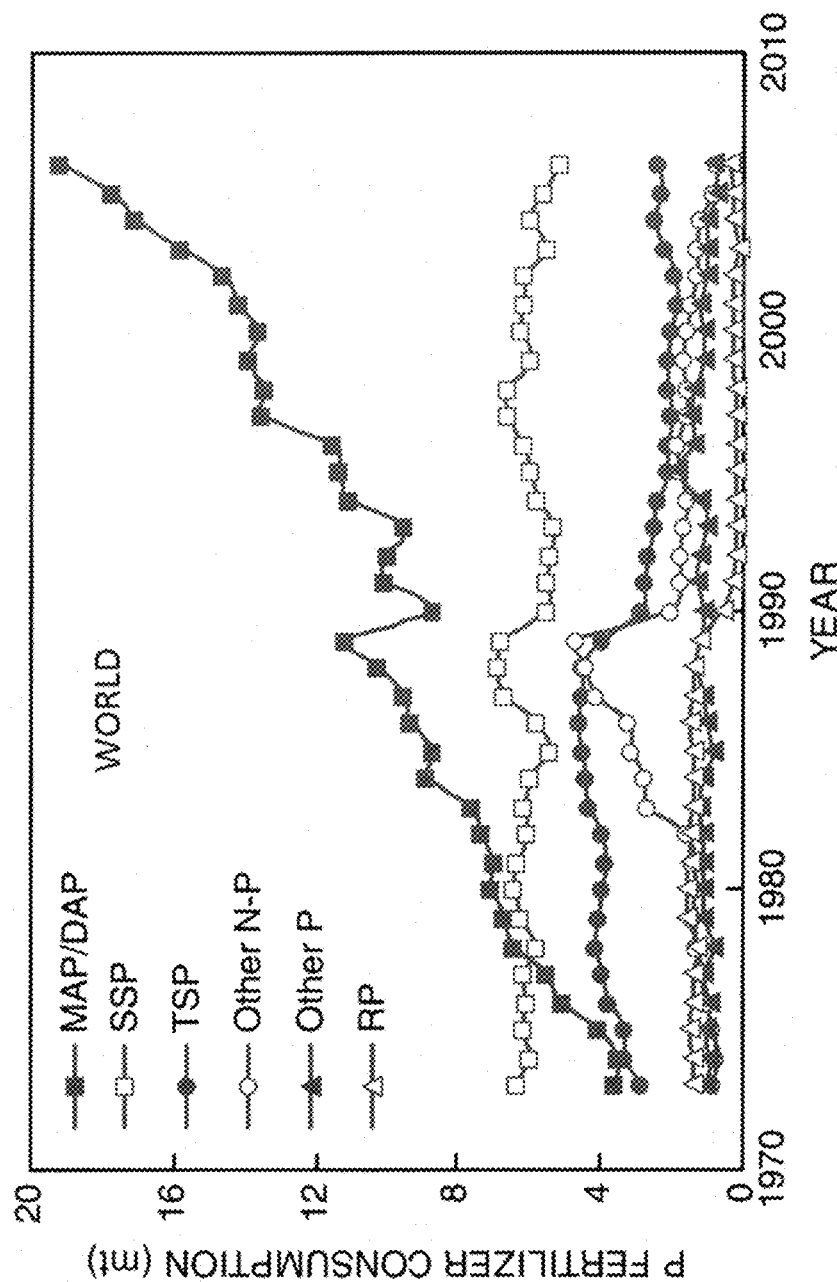
FIG. 2. World phosphorus fertilizer use: mono-ammonium phosphate (MAP), di-ammonium phosphate (DAP), single super phosphate (SSP), other phosphorus and nitrogen fertilizer (Other N—P), other phosphate fertilizer (Other P), and rock phosphate (RP). (Havlin et al., supra.)

The current U.S. and international phosphorus fertilizer markets are dominated by monoammonium phosphate (MAP), diammonium phosphate (DAP), Triple Superphosphate (TSP, monocalcium phosphate) and ammonium polyphosphate (APP) (US consumption only; see FIG. 1), along with single superphosphate (SSP) (international consumption only; see FIG. 2.). These materials have a high $P_2O_5$ content (48-61%, 46-53%, 39-53%, 34-37%, and 16-20% $P_2O_5$ respectively), high water solubility, and a high availability to plants. December 2017 prices were $385/ton for DAP and $278/ton for TSP, while low phosphorus-availability rock phosphate ore had a 2017 value of $80/ton (Index Mundi. 2017. Rock Phosphate Monthly Price—US Dollars per Metric Ton. On the web at: http://www.indexmundi.com/ (verified Feb. 28, 2017).)

At present, neither brushite nor struvite are recognized phosphorus fertilizers in the US nor globally, although they contain 41% and 29% $P_2O_5$, respectively. Relatively little scientific literature, and no field trials, are currently available to make a clear assessment of the value of brushite as a phosphorus source for plants. Greenhouse experiments have shown one-to-one equivalency with conventional phosphorus fertilizers. (See Anderson, T. 2015. Production and Evaluation of Wastewater-Derived Brushite As Fertilizer, University of Wisconsin—Madison, MS Thesis.) Brushite is only sparingly soluble in water (solubility product of $1.87 \times 10^{-7}$ mol $L^{-1}$); at pH 6.5 brushite can sustain levels of ~0.43 mM phosphorus or 13 mg phosphorus $L^{-1}$ (13 ppm) in water.

(See Koutsoukos, P. G. and Valsami-Jones, E. 2004. Phosphorus in Environmental Technologies: Principles and Applications, pp. 193-248, IWA Publishing, London, UK.) In comparison, Matula (2011) reports that 0.8 ppm phosphorus in soil solution is adequate for growth of barley and measured a maximum soil solution phosphorus of 4.3 ppm for 72 soils with widely varying agronomic characteristics. (Matula, J. 2011. Relationship between phosphorus concentration in soil solution and phosphorus in shoots of barley. *Plant Soil and Environment* 57:307-314.) More literature exists on stuvite as a fertilizer, mostly at the greenhouse level, again showing a near one-to-one equivalency with standard phosphorus fertilizers. (Kataki, S, H West, M Clarke and DC Baruah. 2016. Phosphorus recovery as struvite: Recent concerns for use of seed, alternative Mg source, nitrogen conservation and fertilizer potential. Resources, *Conservation and Recycling* 107:142-156.).

Using brushite and struvite recovered from wastewater directly as phosphorus fertilizers is likely the most desirable use of upcycled phosphorus because it requires the least additional processing. However, their use in commercial quantities is predicated upon: 1) brushite and struvite being at least as effective as the conventional phosphorus fertilizers currently in use; and 2) the willingness of farmers to switch to brushite or struvite if they are demonstrably equivalent in performance and price.

Figure 3:
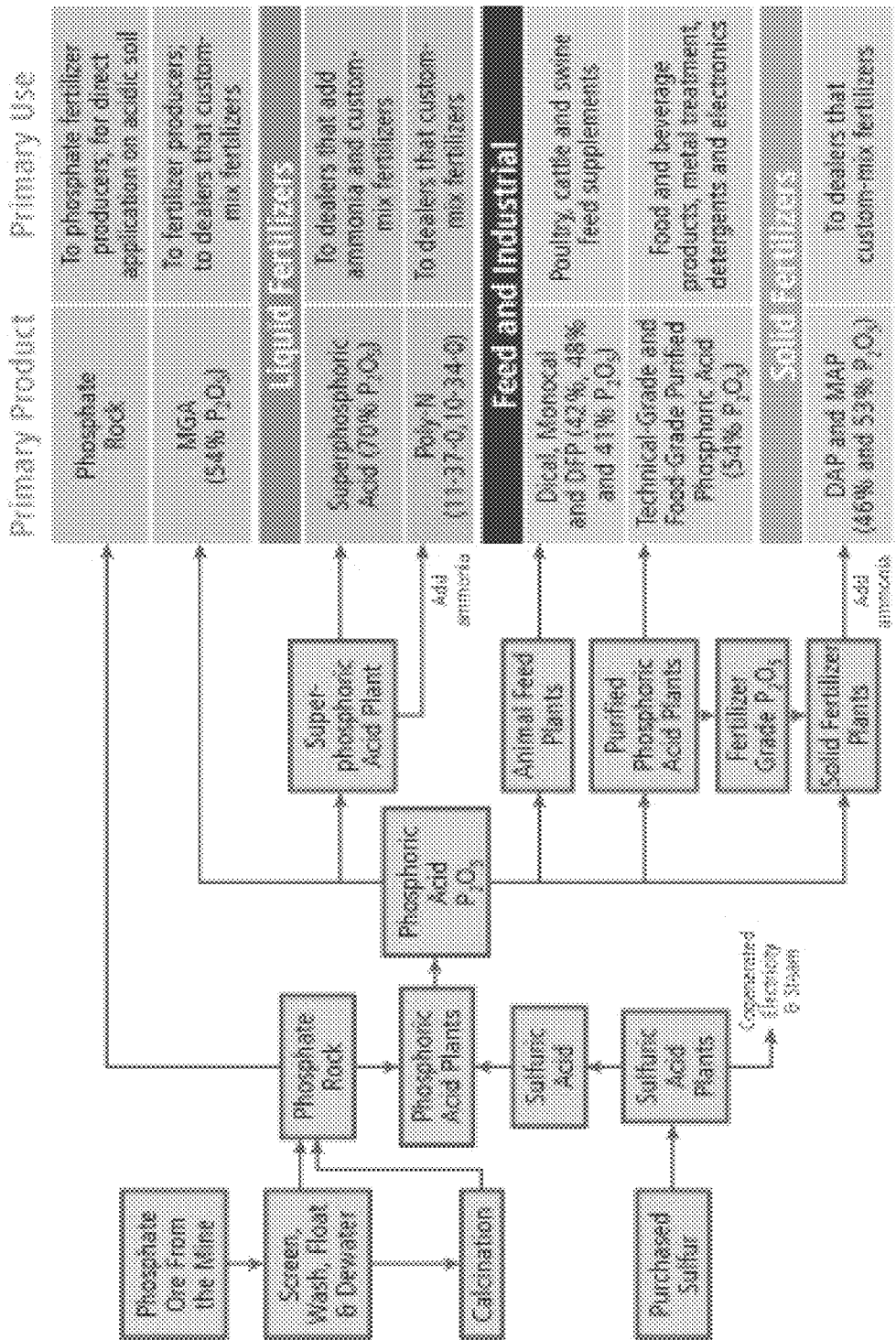
FIG. 3. Flow diagram of rock phosphate ore processing through various stages of end products with a description of their uses.

Use of Upcycled Brushite and Struvite to Manufacture High-Grade Phosphorus Fertilizers:

Brushite and struvite may be considered as ore for the manufacture of standard phosphorus fertilizers such as TSP, DAP and MAP. Currently, commercial production of phosphate fertilizers uses mined phosphate rock as a raw material. Although more than 300 phosphate minerals are known, only minerals in the apatite group occur in sufficient abundance and concentration to serve as commercial sources of the element (D. E. C Cobridge, Phosphorus: Chemistry, Biochemistry, and Technology, 6$^{th}$ ed. CRC Press, Boca Raton, Fla., 2010). Apatite has a crystal formula of $Ca_{10}(PO_4)_6(OH, F, Cl)_2$ and mineralogical endmembers are referred to as hydroxylapatite, fluorapatite, and chlorapatite, respectively. Such minerals are known to have very low solubility. The raw ore is processed into phosphoric acid using strong acid. The phosphoric acid is then further reacted with rock phosphate to make TSP, or is reacted with anhydrous ammonia to make MAP and DAP. See FIG. 3.

Using brushite and struvite as phosphate ores to replace phosphate rock in the production of conventional phosphorus fertilizers has many benefits. These benefits include: 1) Using less sulfuric acid for acidulation and therefore producing less gypsum byproduct; 2) using a softer raw material having a fine particle size; there is no need for additional grinding of the brushite and struvite; 3) no extra processing to remove naturally occurring contaminants found in rock phosphate ores, such as fluorine or radionuclides; 4) similarly, no extra processing to remove metal contaminants (Pb, Cd, Hg, etc.) found in rock phosphate ores; and 4) using a raw material with a naturally low iron, magnesium and aluminum content, thereby yielding a purer phosphoric acid product with far less processing.

In the conventional "wet process" for making phosphoric acid, rock phosphate is slaked with a strong aqueous solution of sulfuric acid. The resulting phosphoric acid is produced by the following reaction:

$$Ca_3(PO_4)_2(s) + 3H_2SO_4 + 6H_2O => 2H_3PO_4 + 3CaSO_4.2H_2O(s) \qquad [1]$$

Here the relatively low solubility of gypsum, $CaSO_4.2H_2O$ (2.55 g/L) is employed to remove calcium and sulfate from solution. In practice, though, separating the liquid phosphoric acid, $H_3PO_4$, from the large mass of fine gypsum solids is technically challenging. Centrifugation is required, which consumes large amounts of energy, and a significant amount of phosphate is retained in the gypsum discard. (In fact, the discarded gypsum is referred to in the industry as "phosphogypsum." Despite its relative safety, the U.S. E.P.A. prohibits use of phosphogypsum in gypsum products such as wall board and plaster due to its radium content as comparted to natural, mined gypsum. See http://www.fipr.state.fl.us/about-us/phosphate-primer/phosphogypsum-and-the-epa-ban/; verified Jan. 4, 2019.) The phosphoric acid produced is typically too dilute to be sold "as is." It must be concentrated by evaporation (also energy intensive) to yield a salable product.

The conventional wet process of making phosphoric acid is used to make the vast majority of the phosphoric acid and phosphate fertilizers sold worldwide. The wet process, however, produces approximately 5 tons of phosphogypsum for every ton of $P_2O_5$. As a result, the wet process has been described (ironically) as a method of making phosphogypsum, with phosphoric acid as a valuable byproduct. (Elgafi, M. I. ©2017. Phosphoric Acid and Phosphate Fertilizers—Volume I: State of the Art and Future Trends, Pacific Academic Press (Forest Grove, Oreg., USA), ISBN 978-0692926062.) Great effort is exerted to filter the phosphoric acid from the mass of gypsum, including using belt filters, tilting pan filters and/or rotating table filters, and washing the gypsum to remove entrained phosphoric acid.

Applying the conventional "wet process" to brushite (i.e., treating brushite with aqueous sulfuric acid) gives the following reaction:

$$CaHPO_4.2H_2O(s) + H_2SO_4 => H_3PO_4 + CaSO_4.2H_2O(s) \qquad [2]$$

Although only two-thirds of the sulfuric acid is required for reaction [2] as for reaction [1] and only two-thirds of the amount of gypsum is generated per unit of phosphoric acid produced, here too the soluble phosphoric acid product is entrained in a mass of fine particles of gypsum and the required solid/liquid separation is difficult.

Treating struvite with sulfuric acid to produce phosphoric acid follows reaction [3]:

$$NH_4MgPO_4.6H_2O(s) + 3/2 H_2SO_4 => H_3PO_4 + NH_4{}^+ + Mg^{2+} + 3/2\ SO_4{}^{2-} + 6H_2O \qquad [3]$$

Upon acidulation of struvite with sulfuric acid, the high solubility of magnesium sulfate—351 g/L at 20° C., approximately 100 times the solubility of gypsum—leaves high concentrations of magnesium and sulfate ions in the reaction mix. The wet process does not satisfactorily accommodate adding of struvite to the rock phosphate.

Treating Brushite and Struvite with Solid-Phase Ion Exchangers:

Ion exchangers are insoluble materials carrying reversibly fixed ions that may be stoichiometrically exchanged for other ions of the same sign. Ion exchangers, particularly currently commercially available ion exchangers, are cross-linked polymers carrying fixed functional groups or sites. Among the cation exchange resins, sulfonate ($-SO_3{}^-$) and carboxylate ($-CO_2{}^-$) groups lead to strong and weak acid cation exchangers, respectively. Ion exchange resins are commonly available as beads of defined sizes, ranging from micrometers to millimeters in diameter.

A cation exchange resin in the acid form may be denoted as R—H$^+$ and the reaction of brushite with a cation exchange resin in the acid form follows the following overall reaction:

$$CaHPO_4.2H_2O(s) + 2R\text{—}H^+(s) => H_3PO_4 + 2R\text{—}Ca^{2+}(s) + 2H_2O \qquad [4]$$

This reaction does not introduce the sulfate ion with sulfuric acid and no gypsum is formed. Further, the calcium ions derived from the brushite are removed by the ion exchange process, which is preferential for divalent ions over monovalent ions such as $H^+$ (except in the case of weak acid exchangers that have a higher specificity for $H^+$). Solid/liquid separation is therefore greatly simplified because the only step required is a simple filtration to remove the millimeter-sized resin beads and a small amount of insoluble residue from the phosphoric acid.

The $Ca^{2+}$-charged cation exchange resin can be regenerated by treating it with any strong acid, concentrated or not, including sulfuric acid:

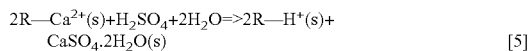

$$2R\!-\!Ca^{2+}(s)+H_2SO_4+2H_2O => 2R\!-\!H^+(s) + CaSO_4 \cdot 2H_2O(s) \quad [5]$$

The overall reaction between brushite and sulfuric acid with the cation exchange resin as the intermediary is the same as the reaction without the cation exchange resin. However, the cation exchange resin employed in this manner prevents the mixing of the phosphoric acid product with the gypsum byproduct and thereby removes the need for and difficulty of a solid/liquid separation.

Partial acidulation of struvite with a cation exchanger follows the reaction:

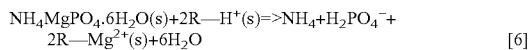

$$NH_4MgPO_4 \cdot 6H_2O(s)+2R\!-\!H^+(s) => NH_4+H_2PO_4^- + 2R\!-\!Mg^{2+}(s)+6H_2O \quad [6]$$

Here the soluble product is monoammonium phosphate, MAP, a well-known and high-value fertilizer.

Complete acidulation of struvite proceeds by reaction [7]:

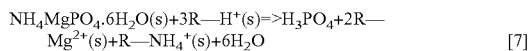

$$NH_4MgPO_4 \cdot 6H_2O(s)+3R\!-\!H^+(s) => H_3PO_4+2R\!-\!Mg^{2+}(s)+R\!-\!NH_4^+(s)+6H_2O \quad [7]$$

Reactions of the ion exchanger with brushite and struvite take advantage of the fact that both minerals are sparingly soluble. The ion exchange process replaces soluble $Ca^{2+}$, in the case of brushite, or $Mg^{2+}$ and $NH_4^+$ in the case of struvite, with equivalent amounts of $H^+$, which lowers the pH of the reaction mix and in turn increases the solubility of these minerals. This increase in solubility releases yet more of their constituent cations until the minerals are fully dissolved. The phosphoric acid produced in one round of brushite and struvite dissolution could be added to a subsequent round to speed dissolution, after which the acid-charged ion exchanger could be added to remove the cations produced by mineral dissolution.

Experimental Results:

Experiments were conducted with lab-synthesized brushite. To 10 mmoles of $R\!-\!H^+$ ("DOWEX"®-brand 50W-X8; Dow Chemicals), amounts of brushite were added that corresponded to molar ratios of 0.5, 1, 2, and 4 moles brushite per mole $R\!-\!H^+$. The mixes were agitated and left overnight to react, after which they were filtered and the filtrates analyzed.

As seen in the table below, supplying two (2) moles of $R\!-\!H^+$ for each mole of brushite reaches the maximum P solubilization (~67%), and that the soluble calcium concentration is low due to the ion exchange between $H^+$ and $Ca^{2+}$.

| Brushite Added, g | Molar ratio | P Concn, mM | Ca Concn, mM | P Solubilized, % |
|---|---|---|---|---|
| 20 | 0.5 | 4.9 | 2.3 | 25% |
| 10 | 1 | 5.1 | 2.4 | 51% |
| 5 | 2 | 3.4 | 0.6 | 67% |
| 2.5 | 4 | 1.6 | 0.0 | 66% |

Additional experiments with a $NH_4^+$-charged cation exchanger showed that only about 15% of the brushite was dissolved. With 1:1 $R\!-\!NH_4\!+\!+\!R\!:\!H^+$, it was found that phosphate solubilization followed the amount of $R\!-\!H^+$ added. Thus, using a $H^+$-charged cation exchanger (alone or in combination with other types of cation exchangers) in the method is preferred (but not required) to yield maximum dissolution of the brushite.

Follow-up experiments were run using brushite collected from the Woodridge Greene Valley phosphate recovery pilot conducted by Nutrient Recovery and Upcycling, LLC (Madison, Wis., USA). Both raw and calcined (heated to a temperature of 500° C. overnight) brushite were used. Calcining the brushite removes most of the organic matter and also dehydrates the brushite to dicalcium phosphate, $CaHPO_4$. To both, a stoichiometric amount of hydrogen cation exchange resin ("DOWEX"®-brand 50W-X8) was added, allowed to react overnight at ambient temperatures, and filtered the following day.

Removing the ion exchange resin beads by filtration proceeded smoothly. The orange-red resin beads were easily captured on 8-μm filter paper and the gypsum-free residue captured on 1.5-μm filter paper. The filtration was much easier with the hydrogen resin treatment than a parallel treatment of brushite with sulfuric acid because there was no co-production of gypsum (which tended both to clog the filters and to pass through a 1.5-μm filter).

A translucent brown acid (pH 2) filtrate was produced. The hydrogen resin treatment with raw brushite produced a 20% $P_2O_5$ filtrate with a 69% recovery of the brushite phosphorus, and a 7% $P_2O_5$ filtrate with 89% recovery using the calcined brushite, on a mass basis.

It is envisioned that as a commercial process in batch mode, the cation exchange resin beads would be sieved off, regenerated with low-quality acid, and recycled back into the process, or put into a column and recharged, much as in a water softener. Alternatively, fluidized bed or expanded bed modes could be used for contacting ion exchange resins with solid-containing solutions. See, for example, Zagorodni, A A. ©2007. Ion Exchange Materials: Properties and Applications. Elsevier, Amsterdam, ISBN: 978-0080445526. The phosphoric acid produced can be reacted with ammonia or with ammonium bicarbonate to make mono- or di-ammonium phosphates.

The choice of ion exchanger is not critical to the functionality of the method and is not limited to the specified carboxylic and sulfonic groups used in the experiments.

Market:

The disclosed method is of commercial interest to those businesses currently or potentially in the market to produce brushite and struvite from wastewater at water treatment plants and to process it into conventional fertilizers. Such conventional fertilizers derived from wastewater would not be "organic," per se, but could certainly be truthfully labeled as "sustainably produced" or "100% post-consumer recycled materials." Thus, the method creates a unique market that does not exist at present. The fertilizer so produced could be priced at a premium compared to conventional fertilizers produced from virgin materials.

What is claimed is:

1. A method of producing phosphoric acid comprising: contacting at least one mineral with a cation exchanger for a time and at a temperature sufficient to yield phosphoric acid from the mineral, wherein the mineral comprises phosphate and at least one element selected from the group consisting of calcium, magnesium, iron, and aluminum, and wherein the mineral requires from 30 to 1000 mass parts of water of pH 7.0 to one mass part of the mineral to dissolve the mineral and has increased solubility in acidic water having a pH range from about 2.0 to less than 7.0.

2. The method of claim 1, wherein the cation exchanger comprises a solid substrate functionalized with a cation exchange moiety selected from the group consisting of carboxylic acid, sulfonic acid, phosphonic acid, carboxyalkyl, sulfoalkyl, phosphoalkyl, sulfoxyalkyl, and orthophosphate.

3. The method of claim 1, comprising contacting with the cation exchanger at least one mineral selected from the group consisting of brushite ($CaHPO_4.2H_2O$), struvite ($NH_4MgPO_4.6H_2O$), monetite ($CaHPO_4$), octacalcium phosphate ($Ca_4H(PO_4)_3.2½H_2O$), newberryite ($MgHPO_4.3H_2O$), bobierrite ($Mg_3(PO_4)_2.8H_2O$), strengite ($FePO_4.2H_2O$), vivianite ($Fe_3(PO_4)_2.8H_2O$), variscite ($AlPO_4.2H_2O$), berlinite ($AlPO_4$), and amorphous, noncrystalline phosphate residuals recovered from wastewater treatment.

4. The method of claim 3, wherein the cation exchanger comprises a solid substrate functionalized with a cation exchange moiety selected from the group consisting of carboxylic acid, sulfonic acid, phosphonic acid, carboxyalkyl, sulfoalkyl, phosphoalkyl, sulfoxyalkyl, and orthophosphate.

5. The method of claim 1, comprising contacting brushite with the cation exchanger.

6. The method of claim 5, wherein the cation exchanger comprises a solid substrate functionalized with a cation exchange moiety selected from the group consisting of carboxylic acid, sulfonic acid, phosphonic acid, carboxyalkyl, sulfoalkyl, phosphoalkyl, sulfoxyalkyl, and orthophosphate.

7. The method of claim 1, comprising contacting struvite with the cation exchanger.

8. The method of claim 7, wherein the cation exchanger comprises a solid substrate functionalized with a cation exchange moiety selected from the group consisting of carboxylic acid, sulfonic acid, phosphonic acid, carboxyalkyl, sulfoalkyl, phosphoalkyl, sulfoxyalkyl, and orthophosphate.

9. The method of claim 1, wherein the at least one mineral is isolated from a water stream.

10. The method of claim 1, wherein the cation exchanger is acid-charged.

11. A method of producing phosphoric acid comprising:
(a) isolating from a water stream at least one mineral, wherein the mineral comprises phosphate and at least one element selected from the group consisting of calcium, magnesium, iron, and aluminum, and wherein the mineral requires from 30 to 1000 mass parts of water of pH 7.0 to one mass part of the mineral to dissolve the mineral and has increased solubility in acidic water having a pH range from about 2.0 to less than 7.0; and
(b) contacting the at least one mineral with a cation exchanger for a time and at a temperature sufficient to yield phosphoric acid from the mineral.

12. The method of claim 11, wherein the cation exchanger of step (b) comprises a solid substrate functionalized with a cation exchange moiety selected from the group consisting of carboxylic acid, sulfonic acid, phosphonic acid, carboxyalkyl, sulfoalkyl, phosphoalkyl, sulfoxyalkyl, and orthophosphate.

13. The method of claim 11, wherein step (b) comprises contacting with the cation exchanger at least one mineral selected from the group consisting of brushite ($CaHPO_4.2H_2O$), struvite ($NH_4MgPO_4.6H_2O$), monetite ($CaHPO_4$), octacalcium phosphate ($Ca_4H(PO_4)_3.2½H_2O$), newberryite ($MgHPO_4.3H_2O$), bobierrite ($Mg_3(PO_4)_2.8H_2O$), strengite ($FePO_4.2H_2O$), vivianite ($Fe_3(PO_4)_2.8H_2O$), variscite ($AlPO_4.2H_2O$), berlinite ($AlPO_4$), and amorphous, noncrystalline phosphate residuals recovered from wastewater treatment.

14. The method of claim 13, wherein the cation exchanger of step (b) comprises a solid substrate functionalized with a cation exchange moiety selected from the group consisting of carboxylic acid, sulfonic acid, phosphonic acid, carboxyalkyl, sulfoalkyl, phosphoalkyl, sulfoxyalkyl, and orthophosphate.

15. The method of claim 11, wherein step (b) comprises contacting brushite with the cation exchanger.

16. The method of claim 15, wherein the cation exchanger of step (b) comprises a solid substrate functionalized with a cation exchange moiety selected from the group consisting of carboxylic acid, sulfonic acid, phosphonic acid, carboxyalkyl, sulfoalkyl, phosphoalkyl, sulfoxyalkyl, and orthophosphate.

17. The method of claim 11, wherein step (b) comprises contacting struvite with the cation exchanger.

18. The method of claim 17, wherein the cation exchanger of step (b) comprises a solid substrate functionalized with a cation exchange moiety selected from the group consisting of carboxylic acid, sulfonic acid, phosphonic acid, carboxyalkyl, sulfoalkyl, phosphoalkyl, sulfoxyalkyl, and orthophosphate.

19. The method of claim 11, wherein step (a) comprises isolating the at least one mineral from a waste-water stream.

20. The method of claim 11, wherein the cation exchanger is acid-charged.

* * * * *